3,071,081
REGULATING AND MIXING DEVICE
Louis F. Mullick, 217 Townsend Ave.,
Pelham Manor, N.Y.
Filed Dec. 27, 1960, Ser. No. 78,591
16 Claims. (Cl. 103—272)

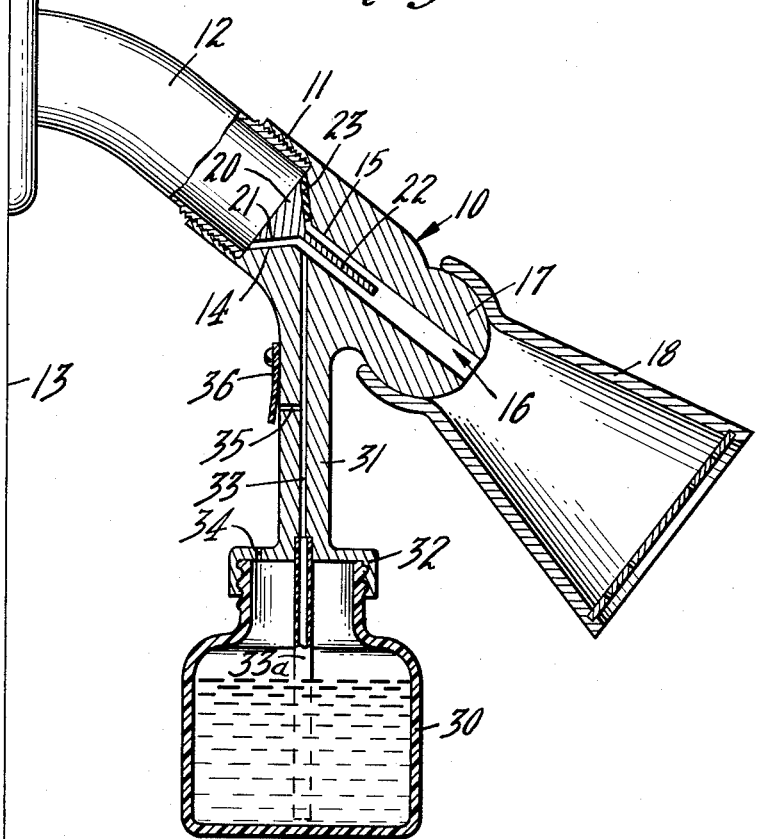
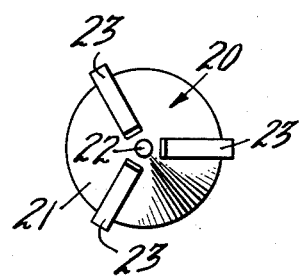

The present invention relates to a mixing device for selectively mixing air or oil into water, and in particular to a mixing device connectable to a source of water under pressure and which mixes oil or air with the water in preset quantity proportions while the water is being dispersed at a preset and nearly constant rate of flow independent of the pressure of the water source.

One of the objects of the present invention is to provide a mixing device which selectively mixes air or oil with water passing through the device from a source of water.

Another object of the invention is to provide a mixing device which simultaneously automatically regulates the rate of flow of water from a source of water under pressure and also selectively mixes air or oil in the water in a proportion at least partially dependent on the rate of flow of the water.

Another object of the invention is to provide a mixing device which mixes air or oil with water and which while water is being forced through the device, mixes air with the water at all times during which oil is not being mixed with the water.

Another object of the invention is to provide a device which regulates the rate of flow of liquids or fluids.

Further objects and a fuller understanding of the invention will become apparent from the following description and claims when taken in conjunction with the attached drawings in which FIGURE 1 is an elevation view taken in section of a mixing device incorporating the invention and FIGURE 2 is an end view of one of the members used in the mixing device.

One embodiment of a mixing device containing the features of the present invention as defined in the claims and which accomplishes the objects and results desired and set forth herein is illustrated to show a preferred mode of carrying out the present invention. It is understood that the terms oil, liquid, air, water, and the names of parts or portions of the embodiment are used for purpose of clearly setting forth an example of the invention so that it may be easily understood by others and that, therefore, the structural equivalents of each of these terms is included within the scope and meaning of the term. It is clearly within the scope of the equivalents to mix any mixable liquid and fluid products together as long as these products will flow through the device. This includes the mixing of air or perfume or bath oil or deodorant in shower water during the taking of a shower.

The mixing device illustrated in FIGURE 1 comprises a body 10 having an inlet end 11 connectable to a source of water 12 under pressure. The mixing device in this instance takes the form of a shower head and the source of water 12 under pressure is an ordinary shower water line extending from a wall 13 of a shower room. The body 10 has an external concave surface 14 in the inlet end 11 thereof, and also has a main passageway surface 15 meeting this concave surface 14 and defining a main passageway 16 which opens on the concave surface 14 and extends therefrom through the body 10. Water from the source of water 12 flows under pressure in a direction past the concave surface 14 and through the main passageway 16. The body 10 has a partially spherical outlet end portion 17 adjustably supporting a shower spray forming nozzle 18 mounted thereon in such manner that the shower nozzle 18 may be positioned relative to the body 10 to direct the water as it exits from the main passage 16.

The body 10 supports and carries a member 20 disposed internally thereof. This member 20 has a convex surface 21 facing the concave surface 14 and has an elongated somewhat or modified needle shaped leader portion 22 extending into the main passageway 16. The preferred example illustrates the structure as additionally including the convex and concave surfaces 21 and 14 arranged complimentary in shape to each other with each of the surfaces of a general conical shape. Additionally, each of the generally conical surfaces 14 and 21 has an axis of revolution and the main passageway 16 is in the form of a cylindrical bore, all extending co-axially of the surface 14.

The member 20 is operatively supported in body 10 by means of pressure responsive resilient pads 23 interengaging the concave and convex surfaces 14 and 21 respectively. In actual practice the pads 23 are constructed of soft rubber-like material and are glued or bonded to the member 20 and body 10. The member 20 and resilient pads 23 hold the leader portion 22 in the center of the main passageway 16 and free from engagement with the main passageway surface 15 so as to therewith form a restricted section in the main passageway 16. The facing surfaces of the body 10 and member 20, including the extent and size of the leader portion relative to the main passageway, establish the rate of water flow. Various desired rates of flow may be obtained by altering one or more of the facing surfaces or the length of the leader portion. The resilient pads 23 are spaced equi-distant around the member and automatically space the convex surface 21 of the member 20 from the concave surface 14 of said body 10 a distance at least partly dependent on the pressure of the water source 12. Actual tests show that the same mixing device which has a rate of flow of 1.53 gallons per minute when fastened to a source of water of 60 pounds per square inch static pressure and free flow of 3.91 gallons per minute also has a rate of flow of 1.71 gallons per minute when fastened to a source of water of 82 pounds per square inch static pressure and free flow of 6.84 gallons per minute. In both instances the water from the spray 18 feels soft to the touch.

Thus far that portion of the mixing device through which the water is forced has been set forth. The oil or air, which ever is desired, is fed into the water while it is going through the main passageway 16. The oil is fed from an oil container 30 suspended below the body 10 by a container support leg portion 31 integral with the body 10 and terminating in a cap 32 engaging the top of the container 30. The leg portion 31 is provided with a lateral conduit or passageway 33 merging with the main passageway 16 proximate the concave surface 14 and within the extent of the leader portion 22 to conduct oil from the container 30 to the main passageway 16. Conduit 33 is extended to the bottom of the container by means of a conduit tube 33a carried by cap 32. When the mixing device is used as a shower head it is preferable to have the conduit 33 extend vertically and at an acute angle, in this instance approximately 45°, to the main passageway 16. The lateral conduit 33 merges with passageway 16 in its restricted section within the extent of leader portion 22 so that oil from container 30 is drawn into the restricted section of the main passageway 16 by the water flowing through the restricted section. The cap 32 has an air vent 34 to prevent formation of a vacuum in the container 30.

The air is fed into the water by providing the container support leg portion 31 with the air intake 35 extending between the lateral conduit 33 and the outside surface of the leg portion at a position between cap 34 and the main passageway 16. In this way the air intake 35 is between the oil container 30 and the main passageway 16 so as to cause water flowing through the main passageway 16 to draw air through the air intake in preference to drawing oil from the container 30 at all times during which the air intake is open.

As described, the drawing of air into intake 35 prevents drawing of oil from container 30 into main passageway 16. Oil is drawn from the container only when and so long as air intake 35 is closed and water is forced through the main passageway 16. In this instance the air intake 35 is conveniently closed by a flexible flap or member 36 mounted on the outer surface of leg portion 31 and arranged to overlie and thereby close air intake 35. The flexible member 36 has a relaxed position remote from and spaced from the air intake so that the air intake is normally open to mix air with the water passing through. Pressing the flexible member 36 against the leg portion seats it against the outer surface of the leg portion 31 due to suction in 33 about the air intake 35, thereby closing the air intake and causing water being forced through the body to draw oil from the container 30. The oil mixes in with the water in main passageway 16 and the mixture exits in a spray from shower nozzle 18.

The present invention may be constructed from semi-rigid or rigid metal, plastic, or other suitable fabricating materials and is not limited to the specific details set forth in the foregoing examples which should be construed as illustrative and not by way of limitation and, in view of the numerous modifications which may be affected therein without departing from the spirit and scope of this invention, it is desired that only such limitations be imposed as are indicated in the appended claims.

What is claimed is:

1. A device comprising a body having an inlet end connectable to a source of fluid under pressure and having an external concave surface in said inlet end thereof, a main passageway surface meeting said concave surface and defining a main passageway opening on said concave surface and extending therefrom through said body, a member having a convex surface facing said concave surface and having a leader portion extending into said passageway, pressure responsive resilient means interposed between said concave and convex surfaces and automatically spacing the convex surface of said member from the concave surface of said body a distance at least partly dependent on the pressure of said fluid source.

2. The structure as defined in claim 1 additionally including said concave and convex surfaces being complementary in shape to each other.

3. The structure as defined in claim 1 additionally including each of said concave and convex surfaces being of general conical shape and complementary to each other.

4. The structure as defined in claim 3 additionally including each of said concave and convex surfaces having an axis of revolution and said main passageway extending co-axially of said concave and convex surfaces.

5. The structure as defined in claim 1 additionally including said member and resilient means holding said leader portion in the center of said main passageway and free from engagement with said main passageway surface and therewith forming a restricted section in said passageway.

6. The structure as define in claim 1 additionally including said pressure responsive resilient means comprising a plurality of pads spaced equi-distant around said member.

7. The structure as defined in claim 6 additionally including each of said pads being bonded to both of said surfaces.

8. A device comprising a body having an inlet end connectable to a source of fluid under pressure and having an external concave surface in said inlet end thereof, a main passageway surface meeting said concave surface and defining a main passageway opening on said concave surface and extending therefrom through said body, a member having a convex surface facing said concave surface and having a leader portion extending into said passageway, pressure responsive resilient means interposed between said concave and convex surfaces and automatically spacing the convex surface of said member from the concave surface of said body a distance at least partly dependent on the pressure of said fluid source, a container support leg portion joined with said body and provided with a lateral conduit merging with said main passageway proximate said concave surface and within the extent of said leader portion to conduct oil from a container mounted on said support portion to said passageway, said support leg portion including an air intake extending between said lateral conduit and the outside surface of said portion, and a closure means for said air intake.

9. The structure as defined in claim 8 additionally including said closure means constituting a flexible member carried by said body and having a relaxed position operative to render the air intake open and another position operative to seal and thereby render the air intake closed.

10. A device comprising a body having an inlet end connectable to a source of water under pressure and having an external concave conical-shaped surface in said inlet end thereof, a main passageway surface meeting said concave surface and defining a main passageway opening on said surface and extending therefrom through said body, a member having a convex conical-shaped surface complementary in shape to and facing said concave surface and having a leader portion extending into said passageway, said conical-shaped and main passageway surfaces having common axis of revolution and said leader portion extending along said axis, pressure responsive resilient pads of rubber-like material spaced equidistant about said member and bonded to said concave and convex surfaces and automatically spacing the convex surface of said member from the concave surface of said body a distance at least partly dependent on the pressure of said water source, a container support leg portion integral with said body and provided with a lateral conduit merging with said main passageway proximate said concave surface and within the extent of said leader portion to conduct oil from a container mounted on said support portion to said passageway, said support including an air intake extending between said lateral conduit and the outside surface of said portion, and closure means constituting a flexible member carried by said leg portion and having a relaxed position operative to render the air intake open and an unrelaxed position sealingly engageable with the leg portion about said intake and maintainable thereagainst by the difference in pressure within and without said air intake thereby to render the air intake closed.

11. The structure of claim 8 additionally including said body and leg portion comprising a single piece of material.

12. A device comprising a body having an inlet end connectable to a source of fluid under pressure and having an external concave surface in said inlet end thereof, a main passageway surface meeting said concave surface and defining a main passageway opening on said concave surface and extending therefrom through said body, a member having a convex surface facing said concave surface and having a leader portion extending into said passageway, pressure responsive resilient means interposed between said concave and convex surfaces and automatically spacing the convex surface of said member from the concave surface of said body a distance at least partly dependent on the pressure of said fluid source, a container support leg portion joined with said body and provided with a lateral conduit merging with said main passageway proximate said concave surface and within the extent of said leader portion to conduct oil from a container mounted on said support portion to said passageway.

13. A device comprising a body having an inlet end connectable to a source of fluid under pressure and having an external concave surface in said inlet end thereof, a main passageway surface meeting said concave surface and defining a main passageway opening on said concave surface and extending therefrom through said body, a member having a convex surface facing said concave surface and having a leader portion extending into said passageway, pressure responsive resilient means interposed between said concave and convex surfaces and automatically spacing the convex surface of said member from the concave surface of said body a distance at least partly dependent on the pressure of said fluid source, a lateral conduit merging with said main passageway proximate said concave surface and within the extent of said leader portion, and an air intake extending between said lateral conduit and the outside of said device.

14. The structure as defined in claim 13 additionally including closure means for said air intake.

15. The structure as defined in claim 14, additionally including said closure means constituting a flexible member carried by said body and having a relaxed position operative to render the air intake open and another position operative to seal and thereby render the air intake closed.

16. A device comprising a body having an inlet end connectable to a source of fluid under pressure and having an external concave surface in said inlet end thereof, a main passageway surface meeting said concave surface and defining a main passageway opening on said concave surface and extending therefrom through said body, a member having a convex surface facing said concave surface, pressure responsive resilient means interposed between said concave and convex surfaces and automatically spacing the convex surface of said member from the concave surface of said body a distance at least partly dependent on the pressure of said fluid source.

References Cited in the file of this patent
UNITED STATES PATENTS

| | | |
|---|---|---|
| 2,078,347 | Shepherd et al. | Apr. 27, 1937 |
| 2,690,717 | Goodrie | Oct. 5, 1954 |
| 2,919,073 | Akselrad et al. | Dec. 29, 1959 |